US007080899B2

(12) United States Patent
Yoshizawa et al.

(10) Patent No.: US 7,080,899 B2
(45) Date of Patent: Jul. 25, 2006

(54) INK JET RECORDING APPARATUS AND INK JET RECORDING METHOD

(75) Inventors: Tomomi Yoshizawa, Hino (JP); Yasuhiko Kawashima, Hino (JP)

(73) Assignee: Konica Minolta Holdings, Inc. (JP)

( * ) Notice: Subject to any disclaimer, the term of this patent is extended or adjusted under 35 U.S.C. 154(b) by 190 days.

(21) Appl. No.: 10/675,120

(22) Filed: Sep. 30, 2003

(65) Prior Publication Data

US 2004/0119797 A1 Jun. 24, 2004

(30) Foreign Application Priority Data

Oct. 2, 2002 (JP) ............................ 2002-289842

(51) Int. Cl.
*G01D 11/00* (2006.01)
*B41J 2/175* (2006.01)

(52) U.S. Cl. ........................................ 347/100; 347/85

(58) Field of Classification Search .................. 347/68, 347/85, 92, 100; 148/240, 519; 106/31.46, 106/31.6, 31.77
See application file for complete search history.

(56) References Cited

U.S. PATENT DOCUMENTS

| | | | | |
|---|---|---|---|---|
| 4,489,334 | A * | 12/1984 | Owatari | 347/92 |
| 5,944,917 | A * | 8/1999 | Takeda et al. | 148/240 |
| 5,997,136 | A * | 12/1999 | Fujisawa et al. | 347/101 |
| 6,676,735 | B1 * | 1/2004 | Oki et al. | 106/31.46 |
| 6,729,718 | B1 * | 5/2004 | Goto et al. | 347/100 |
| 6,733,113 | B1 * | 5/2004 | Yoshizawa et al. | 347/68 |

FOREIGN PATENT DOCUMENTS

| | | | |
|---|---|---|---|
| JP | 362288045 | A * | 12/1987 |
| JP | 04107129 | A * | 8/1990 |
| JP | 2002256187 | A * | 9/2002 |
| JP | 2004202706 | A * | 12/2002 |

* cited by examiner

*Primary Examiner*—Anh T. N. Vo
(74) *Attorney, Agent, or Firm*—Cantor Colburn LLP

(57) ABSTRACT

An ink jet recording apparatus for jetting ink onto a recording medium having: an ink cartridge; an ink jet recording head; and an ink supply tube which connects the ink cartridge and the ink jet recording head, wherein a driving frequency of the ink jet recording head is 15 kHz or above, and an average surface roughness of an inner surface of the ink supply tube is 200 to 2,000 nm.

30 Claims, 2 Drawing Sheets

INK JET RECORDING APPARATUS AND INK JET RECORDING METHOD

BACKGROUND OF THE INVENTION

1. Field of the Invention

The present invention relates to an ink jet recording apparatus and an ink jet recording method with an improved ink jetting property.

2. Description of the Related Art

As digital cameras and computers are more widely disseminated in recent years, a rapid progress has been made in hard-copy-image recording method for recording images obtained by these instruments onto paper or the like. An ultimate object of the hard copy resides in how to make an image quality be close to that of silver-salt photograph, particularly in gamut of color reproduction, color density, texture, resolution, glossiness, light resistance or the like.

The hard-copy recording system includes not only those directly taking a photograph of an image appeared on a display by silver-salt photographing, but also a vast variety of recording systems such as sublimation heat-sensitive transfer system, ink jet system and electrostatic recording system.

Of the above-mentioned recording systems, the ink jet recording system has been making a rapid progress in various fields because it can record high-definition images using a relatively simple apparatus. Printers that employ the ink jet recording system are manufactured in a wide variety of fields, and there are also a wide variety of inks corresponding to the purpose of use.

The ink jet recording apparatus used in the ink jet recording system is configured so as to allow ink droplets to fly (be jetted) while laterally reciprocating a recording head having a plurality of nozzles mounted thereon, to thereby form an image (pattern) according to image data on a recording medium which is typically a plain paper, special coated paper or the like in synchronization with movement of the recording medium.

The ink jet recording method is however disadvantageous in that it is slower in the recording speed than the electrophotographic system or fusion thermal transferring system. Efforts for solving the problem have therefore been made through increase in the driving frequency per one nozzle, or through increase in the number of nozzles per one color, and these efforts have been rapidly improving the recording speed. The increase in the number of nozzles per one color, however, raises the load in terms of cost, and the increase in the driving frequency degrades ink jetting property to cause a problem such as causing a bend of the flight direction of the droplets easily, where the bend becomes more remarkable when the driving frequency exceeds 15 kHz, and this is causative of streak-like unevenness when printing a uniform image.

On the other hand, there are various inks used for the ink jet printing system, which are classified depending on solvents or coloring materials used therefor into water-soluble dye ink, oil-soluble dye ink, water-base dispersion pigment ink, oil-base dispersion pigment ink or the like, and are selectable depending of applications. In particular, the water-base dispersion pigment ink is featured by its low impact on the environment through the use of water or water-soluble solvent as the main solvent and by its relatively large light resistance through the use of pigment as the coloring material. Thus, the water-base dispersion pigment ink became more widely used ranging from a system for producing posters or electric decoration to a printer for office use. However, the pigment inks has a drawback that they are more likely to cause clogging in the nozzle as compared with the dye inks.

Inventors of the present invention analyzed the above-described problems, and found out that the degradation of the ink jetting property was largely affected by characteristics of an ink supply tube disposed between an ink cartridge and an ink jet recording head. More specifically, it be came clear that air bubble which attaches on the inner surface of the ink supplying tube, or a component of the ink which runs through the ink supplying tube deposits and attaches on the inner surface of the ink supplying tube as foreign matter. Therefore, the ink jetting stability is affected.

Various methods have been proposed in order to solve the problems on the ink jetting property. For example, Japanese Laid-Open Patent Publication No. 7-223322 discloses an approach of subjecting the ink supply tube to ozone treatment to thereby improve the ink wetting property thereof and make it possible to expel the air bubbles. Japanese Laid-Open Patent Publication No. 7-266572 proposes a method of selecting a material in which an adhesion work expressed by surface tension of the ink and a contact angle between the material for composing ink supply system and the ink is lower than or equal to a specified value in order to prevent the ink adhesion at the ink contact portion in the ink supply system. Japanese Laid-Open Patent Publication No. 8-156276 discloses a method of reducing adhesiveness of air bubbles by controlling the contact angle of the ink to the ink supply tube to as small as 10° or less. Japanese Laid-Open Patent Publication Nos. 2000-211149 and 2001-162817 further propose that the ink wetting property is improved by subjecting components of the ink supply system to ozone treatment or hydrophilization using polymers.

On the other hand, there are proposed methods of limiting the contact angle of the ink to plastic components of the ink supply system within a specific range (Japanese Laid-Open Patent Publication No. 2000-141692 (p. 1) and Japanese Patent Publication No. 3033190 (p. 2)). It is, however, difficult to obtain a stable ink jetting property only by controlling the contact angle of the ink to the components of the ink supply system, particularly in a high-speed ink jet recording system such as having a driving frequency of the recording head of as high as 15 kHz or above as described above, so that there are demands for further improvement.

SUMMARY OF THE INVENTION

The present invention was developed in view of the above-described problems, and the object thereof is to provide an ink jet recording apparatus and an ink jet recording method ensuring an excellent ink jetting property even in high-speed continuous printing.

The aforementioned object of the present invention will successfully be achieved by the configurations described below.

In accordance with a first aspect of the present invention, the ink jet recording apparatus for jetting ink onto a recording medium comprises:

an ink cartridge;

an ink jet recording head; and an ink supply tube which connects the ink cartridge and the ink jet recording head, wherein a driving frequency of the ink jet recording head is 15 kHz or above, and an average surface roughness of an inner surface of the ink supply tube is 200 to 2,000 nm.

In accordance with a second aspect of the present invention, the ink jet recording method for jetting ink onto a recording medium by using an ink jet recording apparatus which has an ink cartridge, an ink jet recording head, and an ink supply tube having an average surface roughness of an inner surface of 200 to 2,000 nm, which connects the ink cartridge and the ink jet recording head, comprises:

driving the ink jet recording head at a driving frequency of 15 kHz or above.

Preferably, in the ink jet recording apparatus or the ink jet recording method, the ink which contains a colorant, water and a water-soluble organic solvent, the ink having a viscosity of 3.0 to 8.0 mPa·s.

Preferably, the ink contains a colorant, water and a water-soluble organic solvent, the ink having a surface tension of 20 to 35 mN/m.

Preferably, the ink contains a colorant, water and a water-soluble organic solvent, the ink having a dissolved oxygen concentration of 4 ppm or below.

Preferably, the dissolved oxygen concentration is 2 ppm or below.

Preferably, the dissolved oxygen concentration is 0.01 to 1 ppm or below.

Preferably, the ink contains a colorant, water and a water-soluble organic solvent, the ink having a foaming power of 100 mm or below.

Preferably, the driving frequency of the ink jet recording head is 25 kHz or above.

Preferably, the driving frequency of the ink jet recording head is 35 kHz or above.

Preferably, a contact angle of the ink to the inner surface of the ink supply tube is 60° or below.

Preferably, a contact angle of the ink to the inner surface of the ink supply tube is 10° to 60°.

Preferably, an average roughness of the inner surface of the ink supply tube is 400 to 1,000 nm.

Preferably, the colorant is a pigment.

Preferably, the ink contains 1 to 15 wt % of triethylene glycol monobutyl ether, 1,2-hexanediol, 1,2-pentanediol or t-butanol.

Preferably, a total content of calcium ion, magnesium ion and iron ion in the ink is 10 ppm or below.

Preferably, the ink contains an acetylene glycol-base nonionic surfactant.

In consideration of the aforementioned problems, inventors of the present invention found out after extensive investigations that an ink jet recording apparatus and ink jet recording method with an excellent ink jetting property even under high-speed printing could be realized under the following conditions. In an ink jet recording method for jetting ink onto a recording medium by using an ink jet recording apparatus which comprises an ink cartridge, an ink jet recording head, and an ink supply tube which connects the ink cartridge and the ink jet recording head, the driving frequency of the ink jet recording head is 15 kHz or above, the average surface roughness of the inner surface of the ink supply tube is 200 to 2,000 nm, and the ink which contains a colorant, water and a water-soluble organic solvent has at least one of several liquid properties of a viscosity of 3.0 to 8.0 mPa·s, a surface tension of 20 to 35 mN/m, a dissolved oxygen concentration of 4 ppm or below, and a foaming power of 100 mm or below.

BRIEF DESCRIPTION OF THE DRAWINGS

The present invention will become more fully understood from the detailed description given hereinafter and the accompanying drawings which are given by way of illustration only, and thus are not intended as a definition of the limits of the present invention, and wherein.

DETAILED DESCRIPTION OF THE PREFERRED EMBODIMENTS

The present invention will be detailed below.

First, an ink jet recording apparatus of the present invention will be explained.

The ink jet recording apparatus preferably has the recording system based on the on-demand system, and is applicable to any on-demand-type ink jet recording systems. The on-demand systems specifically include electromechanical conversion type (e.g., single-cavity type, double-cavity type, vendor type, piston type, shear-mode type, shared-wall type), electricity-heat conversion system (e.g., thermal ink jet type, bubble jet (R) type), electrostatic suction type (e.g., electric field control type, slit jet type), and discharge system (e.g., spark jet type).

Figure 1:
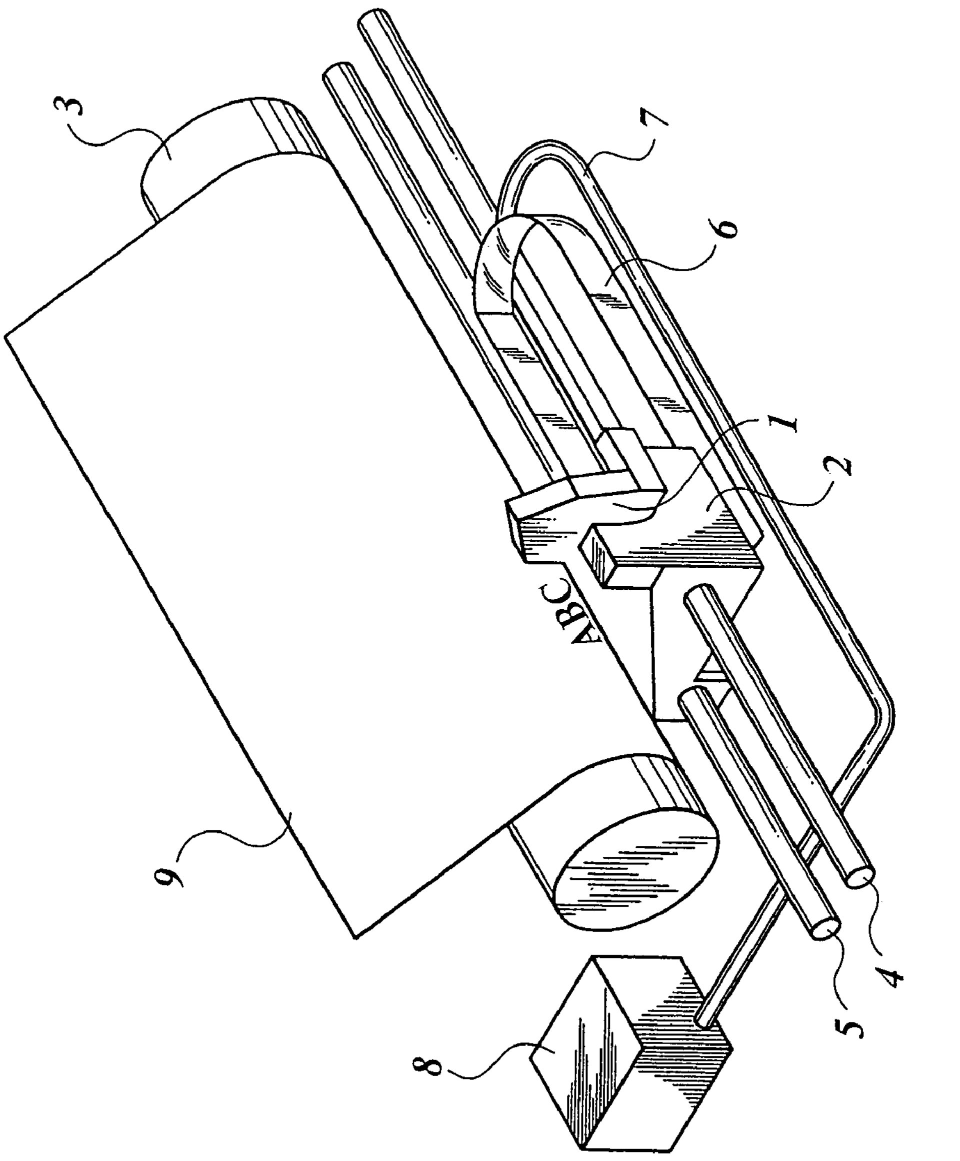
FIG. 1 is a perspective view showing an exemplary ink jet recording apparatus available in the present invention.

FIG. 1 is a perspective view of an exemplary ink jet recording apparatus available in the present invention.

In FIG. 1, a carriage 2 has an ink jet recording head 1 mounted thereon, and the carriage 2 is driven so as to laterally reciprocate along guide rails 4, 5 which are disposed so as to oppose with and in parallel to a platen 3. To the ink jet recording head 1, a connection lead 6 which is formed by a flexible substrate or the like and transmits drive signals, and an ink supply tube 7 for supplying ink from the ink cartridge 8 to the head 1 are connected. A recording medium 9 is fed upward by the platen 3, and adapted ink droplets are jetted from a plurality of nozzles of the head 1 which are attached opposing to the recording medium 9 towards the recording medium 9 so as to form an image thereon.

Figure 2:
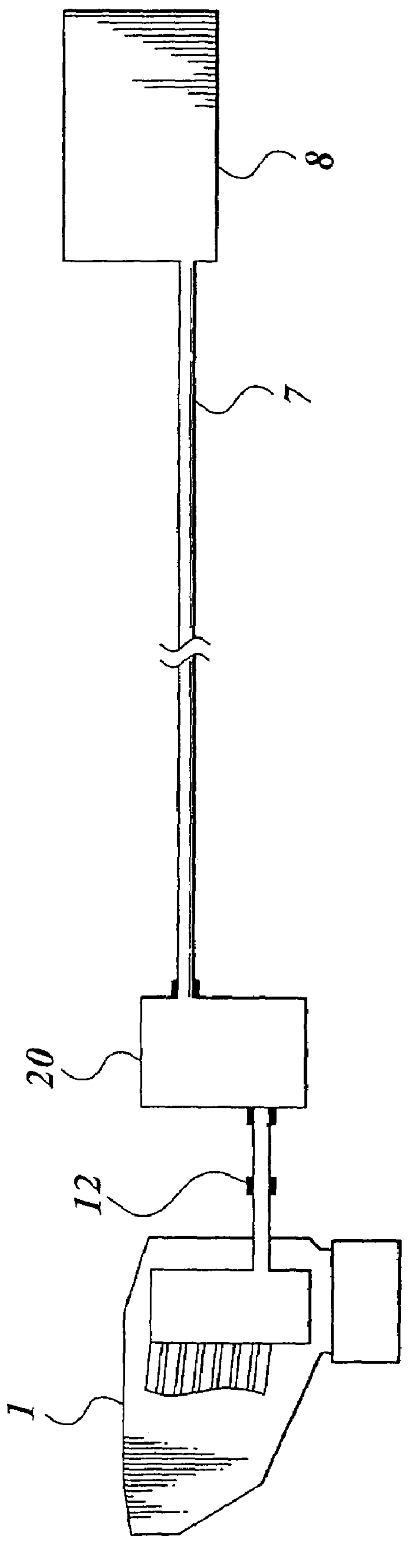
FIG. 2 is a schematic drawing showing an exemplary ink supply path in which an ink cartridge and an ink jet recording head are connected through an ink supply tube.

FIG. 2 is a schematic drawing showing an exemplary ink supply path in which the ink cartridge and the ink jet recording head are connected through an ink supply tube.

As shown in FIG. 2, the ink supply path is formed by the ink cartridge 8 and an ink inlet aperture 12 connected with each other through the ink supply tube 7, and is configured as optionally including a damper 20 connected in midway so as to allow it to absorb pressure fluctuation during printing. The damper 20 is attached herein as a damper unit on the carriage 2 close to the head.

One feature of the ink jet recording apparatus used in the present invention resides in that the driving frequency of the ink jet recording head is 15 kHz or above, preferably 25 kHz or above, more preferably 35 kHz or above, and most preferably 35 to 100 kHz. Based on the conditions for the driving frequency of the ink jet recording head specified as described in the above, high-speed printing can be realized making use of the ink supply tube having the surface roughness as specified in the present invention, which will be described later, and an ink having specific liquid properties.

Next, the ink supply tube in the present invention will be described in detail.

One feature of the present invention resides in that the ink supply tube which connects the ink cartridge and the ink jet recording head has the inner surface whose average roughness is 200 to 2,000 nm, preferably 400 to 1,000 nm.

Use of the ink supply tube having the average roughness of the inner surface thereof as specified above is successful in preventing adhesion of air bubble which resides in the ink supply path or adhesion of foreign matters which is caused by deposition of ink components, and this can realize a stable ink jetting property.

The average roughness of the inner surface of the ink supply tube in the present invention refers to a fine irregular status within a micro area on the inner surface of the ink supply tube, and is determined according to the method described below.

The ink supply tube is cut in halves, and the inner surface thereof is used as a sample. A measuring instrument used herein is RST plus non-contact three-dimensional micro area profiler system, manufactured by WYKO Co.

In the VSI mode, measurement is carried out using an objective lens of 40 magnifications and intermediate lenses of 1.0 and 2.0 magnifications. Measurement conditions are as follows. Scan depth is 40 μm, Mod thresh is 2.0%, Scan back is 15.0 μm, Resolution is 368×238 in full view, and Scan speed is HIGH.

In the analysis, Term removal is corrected by cylinder and tilt (cylinder and tilt correction), and Filtering is effected based on Median Smoothing.

Based on the obtained shape image, average roughness Ra is determined using an attached surface analyzing software "Vision".

Materials for composing the ink supply tube used in the present invention are not specifically limited so far as they can be formed in tube shape with general plastic materials, and the inner surface of the tube can satisfy the average surface roughness specified in the present invention. The materials may be composed of a single material or a mixed material of two or more components, and may further contain any functional additives. The structure thereof may be a single-layered structure or a laminated structure. Examples of preferably available materials include vinylidene chloride resins, poly (vinyl chloride) resins, polyethylene, polypropylene, silicone resin, fluorine-containing resin and nylon.

The ink used in the present invention preferably shows a contact angle to the inner surface of the ink supply tube of 60° or below, and more preferably 10° to 60°. By adjusting the contact angle as specified in the above based on appropriate combinations of the ink liquid and materials composing the ink supply tube used herein, it is made possible to improve wetting property of the ink to the ink supply tube, and to reduce adhesion of foreign matters. Possible approaches for realizing the above-specified contact angle in the present invention include those from the viewpoint of ink supply tube, such as properly selecting the materials therefor, and those from the viewpoint of ink, such as properly selecting or combining species and contents of the water-soluble organic solvents described later, content of metal ion as an impurity, or species of the surfactants.

In general, only gravity and surface tension are exerted on droplet under absence of external force. Because a smaller droplet has a larger surface area with respect to its weight, effect of surface tension overwhelms that of gravity. Force possibly exerted on a micro-droplet is therefore solely the surface tension ($\sigma$:mN/m). An angle between a stationary droplet and a surface of solid is defined as equilibrium contact angle $\theta e$, stationary contact angle, or simply as contact angle $\theta$. The contact angle can be measured typically by using a contact angle meter "CA-X", manufactured by KYOWA INTERFACE SCIENCE CO., Ltd. The ink droplet of 5 μl to be measured is placed on the inner surface of the ink supply tube using a syringe, and the contact angle is measured.

The ink used in the present invention will be described next.

The ink according to the present invention comprises at least a colorant, water and a water-soluble organic solvent.

Any publicly-known colorants may unlimitedly be used as the colorant in the present invention, and any of water-soluble dye, water-dispersible dye, water-dispersible pigment, solvent-soluble dye, solvent-dispersible dye is available. However, use of pigment is preferable in view of achieving a desirable light resistance. Pigments preferably used in the pigment ink include organic pigments such as insoluble organic pigment and lake pigments, and carbon black and so forth.

The insoluble organic pigment is not specifically limited, and preferable examples thereof include azo, azomethine, methine, diphenylmethane, triphenylmethane, quinacridone, anthraquinone, perylene, indigo, quinophthalone, isoindolinone, isoindoline, azine, oxazine, thiazine, dioxazine, thiazole, phthalocyanine and diketopyrrolo pyrrole.

Specific examples of preferably available pigments are listed below.

Magenta and red pigments include C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 177, C.I. Pigment Red 178 and C.I. Pigment Red 222.

Orange and yellow-pigments include C.I. Pigment Orange 31, C.I. Pigment Orange 43, C.I. Pigment Yellow 12, C.I. Pigment Yellow 13, C.I. Pigment Yellow 14, C.I. Pigment Yellow 15, C.I. Pigment Yellow 17, C.I. Pigment Yellow 74, C.I. Pigment Yellow 93, C.I. Pigment Yellow 94 and C.I. Pigment Yellow 138.

Green and cyan pigments include C.I. Pigment Blue 15, C.I. Pigment Blue 15:2, C.I. Pigment Blue 15:3, C.I. Pigment Blue 16, C.I. Pigment Blue 60 and C.I. Pigment Green 7.

Other available examples include carbon black pigments (C.I. Pigment Black 7); C.I. Pigment Yellow 12, 13, 14, 16, 17, 73, 74, 75, 83, 108, 109, 110, 180, 182; C.I. Pigment Red 5, 7, 12, 112, 123, 168, 184, 202; C.I. Pigment Blue 1, 2, 3, 15:3, 16, 22, 60; and C.I. Vat Blue 4, 60.

Beside those listed in the above, it is also preferable to use the pigments listed below in a singular manner or in combination, for the case where red, green, blue or intermediate color is required, where the pigments include:

C.I. Pigment Red 209, 224, 177, 194;
C.I. Pigment Orange 43;
C.I. Vat Violet 3;
C.I. Pigment. Violet 19, 23, 37;
C.I. Pigment Green 36, 7; and
C.I. Pigment Blue 15:6.

The pigments used in the present invention is preferably used after dispersed together with a dispersing agent or other necessary additives depending on desired purposes using a dispersion machine. Examples of the available dispersion machine include publicly-known ball mill, sand mill, line mill and high-pressure homogenizer.

Surfactants can be used as the dispersing agent. Any of cationic, anionic, amphoteric and nonionic surfactants are available in the present invention. Examples of cationic surfactant include aliphatic amine salt, aliphatic quaternary ammonium salt, benzalconium salt, benzethonium chloride, pyridinium salt and imidazolinium salt. Examples of anionic surfactant include fatty acid soap, N-acyl-N-methylglycine salt, N-acyl-N-methyl-β-alanine salt, N-acylglutamic acid salt, acylated peptide, alkylsulfonic acid salt, alkylbenzenesulfonic acid salt, alkylnaphthalenesulfonic acid salt, dialkylsulfosuccinic acid ester salt, alkylsulfoacetic acid salt, α-olefinsulfonic acid salt, N-acylmethyl taurine, sulfated oil, higher alcohol sulfate ester salt, secondary higher alcohol sulfate ester salt, alkylether sulfate salt, secondary higher alcohol ethoxysulfate, polyoxyethylene alkyl phenyl ether sulfate salt, monoglysulfate, fatty acid alkylolamide sulfate ester salt, alkylether phosphate ester salt and alkyl phosphate ester salt. Examples of amphoteric surfactant include those of calboxybetaine type, sulfobetaine type, aminocarboxylic acid salt and imidazolinium betaine. Examples of the nonionic surfactant include polyoxyethylene secondary alcohol ether, polyoxyethylene alkyl phenyl ether, polyoxyethylene sterol ether, polyoxyethylene lanorine derivatives, polyoxyethylene polyoxypropylene alkyl ether, polyoxyethylene glycerin fatty acid ester, polyoxyethylene castor oil, hydrogenated castor oil, polyoxyethylene sorbitol fatty acid ester, polyethylene glycol fatty acid ester, fatty acid monoglyceride, polyglycerin fatty acid ester, sorbitan fatty acid ester, propylene glycol fatty acid ester, glucose fatty acid ester, fatty acid alkanol amide, polyoxyethylene fatty acid amide, polyoxyethylene alkylamine, alkyl amine oxide, acetylene glycol and acetylene alcohol.

As the polymer dispersing agent used in the present invention, water-soluble resin described below can be used, which are preferable in terms of jetting stability. Examples of the water-soluble resin include styrene-acrylic acid-acrylic acid alkyl ester copolymer, styrene-acrylic acid copolymer, styrene-maleic acid-acrylic acid alkyl ester copolymer, styrene-maleic acid copolymer, styrene-methacrylic acid-acrylic acid alkyl ester copolymer, styrene-methacrylic acid copolymer, styrene-maleic acid half ester copolymer, vinylnaphthalene-acrylic acid copolymer and vinylnaphthalene-maleic acid copolymer.

Adding amount of the polymer dispersing agent to the total amount of the dispersion ink preferably falls within a range from 0.1 to 10 wt %, and more preferably from 0.3 to 5 wt %.

These polymer dispersing agents may be used in combination of two or more species.

It is also preferable to use a surfactant in order to accelerate permeation of the ink droplet in the medium after the jetting. The surfactant is not specifically limited so far as it does not adversely affect storage stability or the like of the ink, and those surfactants listed in the above for use as the dispersing agent can be used. It is particularly preferable to use acetylene glycol-base nonionic surfactant.

The ink used in the present invention contains water and water-soluble organic solvent as major components for the liquid medium. Examples of the water-soluble organic solvent include alcohols (e.g., methanol, ethanol, propanol, isopropanol, butanol, isobutanol, secondary butanol, tertiary butanol, pentanol, hexanol, cyclohexanol, benzyl alcohol); multivalent alcohols (e.g, ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol); multivalent alcohol ethers (e.g., ethylene glycol monomethyl ether, ethylene glycol monoethyl ether, ethylene glycol monobutyl ether, ethylene glycol monophenyl ether, diethylene glycol monomethyl ether, diethylene glycol monoethyl ether, diethylene glycol monobutyl ether, diethylene glycol dimethyl ether, propylene glycol monomethyl ether, propylene glycol monobutyl ether, ethylene glycol monomethyl ether acetate, triethylene glycol monomethyl ether, triethylene glycol monoethyl ether, triethylene glycol monobutyl ether, triethylene glycol dimethyl ether, dipropylene glycol monopropyl ether, tripropylene glycol dimethyl ether); amines (e.g., ethanolamine, diethanolamine, triethanolamine, N-methyl diethanolamine, N-ethyl diethanolamine, morpholine, N-ethyl morpholine, ethylenediamine, diethylenediamine, triethylenetetramine, tetraethylenepentamine, polyethyleneimine, pentamethyldiethylenetriamine, tetramethylpropylenediamine); amides (e.g., formamide, N,N-dimethylformamide, N,N-dimethylacetamide); heterocyclic compounds (e.g., 2-pyrrolidone, N-methyl-2-pyrrolidone, N-cyclohexyl-2-pyrrolidone, 2-oxazolidone, 1,3-dimethyl-2-imidazolidinone); sulfoxides (e.g., dimethylsulfoxide); sulfones (e.g., sulfolane); sulfonic acid salts (e.g., sodium 1-butanesulfonate); urea; acetonitrile; and acetone. In the present invention, at least one of the water-soluble solvent is preferably alkylene glycol monoether or alkane diol, where alkylene glycol monoether is preferably ethylene glycol monobutyl ether (butyl cellosolve), diethylene glycol monobutyl ether, triethylene glycol monobutyl ether, ethylene glycol or monophenyl ether, and alkane diol is preferably 1,2-hexanediol or 1,2-pentanediol; more preferably triethylene glycol monobutyl ether, 1,2-hexanediol, 1,2-pentanediol or t-butanol. These water-soluble organic solvent is preferably contained in the ink in an amount of 1 to 15 wt %.

Total content of the water-soluble organic solvents in the ink is preferably 10 to 70% by weight to the total weight of the ink in general, more preferably 30 to 65%, and still more preferably 40 to 60%.

In the present invention, it is also preferable that total content of calcium ion, magnesium ion and iron ion, which are multivalent metal ions contained in the ink, is preferably 10 ppm or below, and more preferably 0.1 to 5 ppm, and still more preferably 0.1 to 1 ppm.

Limitation of the content of the multivalent metal ions in the ink is successful in obtaining the ink having an excellent dispersion stability. The multivalent metal ions available in the present invention are expressed as $Fe^{3+}$, $Mg^{2+}$ and $Ca^{2+}$, and these ions are contained typically in sulfuric acid salt, chloride, nitric acid salt, acetic acid salt, organic ammonium salt and EDTA salt.

The ink used in the present invention may contain an electric conductivity adjusting agent. Examples of the electric conductivity adjusting agent include inorganic salts such as potassium chloride, ammonium chloride, sodium sulfate, sodium nitrate and sodium chloride; and water-soluble amines such as triethanol amine.

The ink used in the present invention may further contain viscosity adjusting agent, specific resistivity adjusting agent, filming aid, ultraviolet absorber, antioxidant, anti-fading agent, rust preventive agent or preservatives depending on purposes of improving jetting stability, adaptability to printing head or ink cartridge, storage stability, image storability and other various characteristics.

One feature of the present invention resides in that the ink has a viscosity of 3.0 to 8.0 mPa·s as one of its liquid properties. Limitation of the viscosity of the ink within the above range successfully realizes high-speed printing and an excellent ink jetting property when the ink is combined with the ink jet recording apparatus configured as described above (characteristics of ink supply tube, driving frequency).

The viscosity (liquid viscosity ratio) in the present invention is expressed by values measured at 25° C., where a measurement instrument is not specifically limited so far as it is verified using the standard solution for calibrating viscometers specified in JIS Z 8809, and those of rotary type, vibration type and capillary type can be used. Examples of the viscometer include Saybolt viscometer and Redwood viscometer, which are typically commercialized as conical-flat-plate-type, E-type viscometer manufactured by TOKIMEC INC., E Type Viscometer (rotary viscometer) manufactured by TOKI SANGYO Co., LTD., B-type viscometer manufactured BL by TOKYO KEIKI CO., Ltd., FVM-80A manufactured by YAMAICHI ELECTRONICS Co., Ltd., Nametre Viscoliner manufactured by JAPAN FLOW CONTROLS CO., LTD., and VISCO MATE MODEL VM-1A manufactured by YAMAICHI ELECTRONICS Co., Ltd.

Another feature of the present invention resides in that the ink has a surface tension of 0 to 30 mN/m as one of its liquid properties. Limitation of the surface tension of the ink within the above range successfully realizes high-speed printing and an excellent ink jetting property when the ink is combined with the ink jet recording apparatus configured as described in the above (characteristics of ink supply tube, driving frequency).

The surface tension in the present invention refers to static surface tension. Methods of measuring the surface tension are described elsewhere in general reference books on surface chemistry or colloid chemistry, typically found in New Course on Experimental Chemistry Vol. 18 (Surface and Colloid), edited by The Chemical Society of Japan, published by Maruzen Co., Ltd., p. 68–117, and can more specifically be determined by the ring method (Du Nouy method) and the vertical plate method (Wilhelmy method).

Another feature of the present invention resides in that the ink has a dissolved oxygen concentration of 4 ppm or less as one of its liquid properties, where it is more preferably 2 ppm or less, and still more preferably 0.01 to 1 ppm.

Limitation of the dissolved oxygen concentration of the ink within the above range successfully suppresses the bubble formation, and realizes high-speed printing and an excellent ink jetting property when the ink is combined with the ink jet recording apparatus configured as described in the above (characteristics of ink supply tube, driving frequency).

The dissolved oxygen concentration of the ink can be measured typically by using a dissolved oxygen meter DO-14P (manufactured by TOA CORPORATION).

In the present invention, there are no special limitations on the methods for adjusting the dissolved oxygen concentration of the ink within the range specified by the present invention, and the ink can effectively be degassed, for example, by treatment under reduced pressure, or in particular by allowing the ink to pass through hollow fibers which comprise a gas-permeable film and reducing the external pressure. It is therefore preferable to adopt a method of degassing the ink used in the present invention, in which the ink is allowed to pass through a gas-permeable film under heating, so as to extensively remove oxygen or other gases within a short period of time.

Another feature of the present invention resides in that the ink has a foaming power of 100 mm or less as one of its liquid properties, where it is more preferably 1 to 100 mm, and more preferably 1 to 50 mm. Limitation of the foaming power of the ink within the above range successfully realizes high-speed printing and an excellent ink jetting property when the ink is combined with the ink jet recording apparatus configured as described in the above (characteristics of ink supply tube, driving frequency).

The foaming power in the present invention can be determined according to the method specified in JIS K3362, where proper selection of species or amount of use of anti-foaming agent, surfactant and water-soluble organic solvent can adjust the foaming power to 100 mm or below.

The anti-foaming agent used herein for reducing the foaming power may be any commercially available products without limitation. Examples of the commercial products include KF96, 66, 69, KS68, 604, 607A, 602, 603, KM73, 73A, 73E, 72, 72A, 72C, 72F, 82F, 70, 71, 75, 80, 83A, 85, 89, 90, 68-1F, 68-2F (trade names) manufactured by Shin-Etsu Chemical Co., Ltd. Although there are no special limitations on adding amount of these products, it is preferable that these products are contained in the ink in the amount of 0.001 to 2 wt %. When the adding amount is less than 0.001 wt %, the bubbles may become more likely to be generated during preparation of the ink and may be difficult to be removed from the ink. Although the adding amount exceeding 2 wt % may be successful in suppressing the bubble generation, the ink may cause repellence during the printing to thereby degrade printing quality. The above range is thus preferable. Surfactants and water-soluble organic solvents available for reducing the foaming power may be selected from any of those listed in the above.

Next, recording medium available in the present invention will be described.

The recording medium available in the present invention may be any of plain paper, coated paper, swelling-type ink-jet recording paper having an ink accepting layer which swells after absorbing the ink liquid, void-type ink jet recording medium having a porous ink accepting layer, and those having a resin base such as a polyethylene terephthalate film in place of paper base, where use of the void-type recording medium having the porous ink accepting layer is preferable in the present invention, and combination of this medium with the above-described ink successfully provides a uniform and sharp image with less noises.

The porous ink jet recording medium can specifically be exemplified by a void-type ink jet recording paper and void-type ink jet recording film. These are the media which is provided with a void layer having an ink absorbing ability, and the void layer is mainly formed by soft aggregation of a hydrophilic binder and an inorganic particle.

Various ways of providing the void layer have been known as methods of forming voids in films, and examples of the methods include 1) a method in which a homogeneous coating liquid containing two or more polymers is coated on a support, and these polymers are allowed to cause phase separation during the drying process to thereby form the voids; 2) a method in which a coating liquid containing a solid particle and a hydrophilic or hydrophobic binder is coated on a support and dried, and a resultant film is dipped into water or a liquid containing an appropriate organic solvent so as to allow the solid particle to dissolve to thereby form the voids; 3) a method in which a coating liquid containing a compound which can foam during the film formation is coated, and the compound is allowed to foam in the drying process to thereby form the voids in the coated film; 4) a method in which a coating liquid containing a porous solid particle and a hydrophilic binder is coated on a support to thereby form the voids within the porous particle or between the particles; and 5) a method in which a coating liquid containing a hydrophilic binder and a solid particle which has a volume almost equivalent to or larger than that of the hydrophilic binder is coated on a support to thereby form the voids between the solid particles. While any of these method can give a good result as far as the ink in the present invention is used, the method described in 5) is particularly preferable.

EXAMPLES

The present invention will specifically be described below referring to Examples, where embodiments of the present invention are by no means limited thereto. It is to be understood that "%" described in the Examples expresses percent by weight (wt %) unless otherwise specifically noted.

Example 1

| Preparation of Pigment Inks | |
|---|---|
| [Preparation of Magenta Pigment Dispersion] | |
| C.I. Pigment Red 122 | 166 g |
| <polymer 1> | |
| monomer 1 (composition ratio: styrene/2-ethylhexyl acrylate/n-butyl acrylate/styrene sulfonic acid = 64/16/15/5) | 32 g |
| diethylene glycol | 180 g |
| deionized water | 1000 g |

The additives listed in the above were mixed, and the mixture was dispersed using a lateral-type bead mill (System Zeta Mini, manufactured by ASHIZAWA Kabusiki-Kaisha.) packed with 0.3-mm zirconia beads in a volume ratio of 60%. The dispersion was diluted with deionized water so as to adjust the pigment concentration to 5 wt %, and then subjected to ion exchange treatment and centrifugation. The supernatant was then desalted by repeating concentration and dilution with water using an ultra-filtration apparatus, until the electric conductivity was reduced to as low as 2000 μS/cm or below, to thereby prepare a magenta pigment dispersion.

[Preparation of Pigment Inks]

The magenta pigment dispersion prepared in the above was added with pure water, and as well as with water-soluble organic solvent, multivalent metal ion (indicated by a total amount of calcium ion, magnesium ion and iron ion) and surfactant listed in Table 1 so as to attain the adding amount shown in Table 1, to thereby prepare magenta pigment inks 1 to 10. Adding amount of the magenta pigment dispersion was properly adjusted so as to adjust the pigment concentration of the individual pigment inks to 3 wt %. For the case where the pigment concentration of the magenta pigment dispersion was too low to adjust the pigment concentration of the pigment ink to 3 wt %, the concentration was adjusted after the pigment dispersion was concentrated by removing water.

Adding amount of the surfactant was property adjusted so as to attain values of surface tension (mN/m) listed in Table 1. The individual pigment inks were also properly adjusted so as to attain dissolved oxygen concentrations listed in Table 1 by allowing the inks under heating to pass through a gas-permeable film. In the final adjustment stage, the inks were adjusted to pH 10.0 using KOH.

Details of the individual additives listed in Table 1 are shown below.

SA1: Surfynol 465 (acetylene glycol-base nonionic according to a method specified in JIS K3362 surfactant, manufactured by Nisshin Chemical Industry Co., Ltd.)

SA2: sulfosuccinic acid di(2-ethylhexyl) sodium salt (anionic surfactant)

DEG: diethylene glycol

GL: glycerin

TGBE: triethylene glycol monobutyl ether 1,2HD: 1,2-hexanediol tBuOH: t-butanol

<<Measurement of Characteristic Values of Pigment Inks>>

The individual pigment inks prepared in the above were subjected to the measurement for the characteristics described below. Results were shown in Table 1.

<Measurement of Viscosity>

Viscosity at 25° C. was measured using an E type viscometer (rotary viscometer) which is a Brookfield analog viscometer manufactured by TOKI SANGYO CO., LTD.

<Measurement of Surface Tension>

The individual inks prepared in the above were subjected to the measurement for the surface tension based on the vertical plate method (Wilhelmy method).

<Measurement of Dissolved Oxygen Concentration>

Dissolved oxygen concentration of the individual inks were measured using a dissolved oxygen meter DO-14P (manufactured by TOA CORPORATION).

<Measurement of Foaming Power>

Foaming power of the individual inks was measured

TABLE 1

| Pigment ink No. | Adding amount of pigment (%) | Surfactant | Water-soluble organic solvent: Species | Water-soluble organic solvent: Adding amount (%) | Amount of multivalent metal ion (ppm) | Viscosity (mPa · s) | Surface tension (mN/m) | Dissolved oxygen concentration (ppm) | Foaming power |
|---|---|---|---|---|---|---|---|---|---|
| 1 | 3.0 | SA1 | DEG/TGBE | 35/9 | 1 | 5.1 | 31 | 1 | 36 |
| 2 | 3.0 | SA1 | DEG/TGBE | 35/9 | 5 | 5.1 | 31 | 5 | 36 |
| 3 | 3.0 | SA2 | DEG/TGBE | 10/5 | 2 | 2.8 | 36 | 2 | 116 |
| 4 | 3.0 | SA2 | DEG | 35 | 11 | 4.1 | 42 | 11 | 46 |
| 5 | 3.0 | SA1 | DEG/1, 2HD | 35/3 | 1 | 4.7 | 31 | 1 | 28 |
| 6 | 3.0 | SA2 | DEG/1, 2HD | 35/3 | 2 | 4.1 | 42 | 2 | 44 |
| 7 | 3.0 | SA1 | GL/tBuOH | 10/10 | 1 | 2.7 | 28 | 1 | 42 |
| 8 | 3.0 | SA1 | GL/tBuOH | 10/10 | 5 | 2.7 | 28 | 5 | 43 |
| 9 | 3.0 | SA2 | DEG | 35 | 17 | 5.1 | 38 | 15 | 109 |
| 10 | 3.0 | SA2 | DEG | 10 | 13 | 5.1 | 36 | 11 | 131 |

<<Image Output and Evaluation>>

(Image Output)

Ink jet recording apparatus having the configurations shown in FIGS. 1 and 2 was used. The obtained inks were respectively housed in the ink cartridge, and jetted towards Ink Jet Paper Photolike QP heavy-type DX (manufactured by Konica Corporation) at a maximum recording density of 720×720 dpi, to thereby output images according to combinations of the ink and individual apparatus-related conditions shown in Table 2 (ink jetting methods 1 to 17). It is to be noted that "dpi" in the present invention expresses number of dots per 2.54 cm.

1) Ink jet recording head
   Nozzle diameter: 20 μm
   Driving frequency: 37 kHz
   Number of nozzles per one color: 128
   Nozzle density for the same color: 180 dpi 2) Ink supply tube Tube 1: made of polyethylene, average surface roughness of inner surface=113 nm Tube 2: made of poly (vinylidene chloride), average surface roughness of inner surface=350 nm Tube 3: made of poly (vinylidene chloride), average surface roughness of inner surface=505 nm Tube 4: made of polyethylene, average surface roughness of inner surface=748 nm Tube 5: made of ethylene-vinyl acetate copolymer, average surface roughness of inner surface=1,892 nm Tube 6: made of poly (vinyl chloride), average surface roughness of inner surface=3,105 nm 3) Output Image A wedge image having a regular 16-step gradation between. 0% to 100% output density was output (in a 3 cm×3 cm patch for the individual density).

(Evaluation of Individual Characteristics)

<Evaluation of Jetting Stability>

According to the individual conditions described in the above, a cycle of a 5-minute image formation and a 5-minute interruption was repeated for one month, and the ink jetting stability after one month was visually observed referring to the criteria shown below:

A: excellent stability in ink jetting property, judged as no problem;

B: only a part of nozzles caused a slight degree of jetting failure, but judged as almost no problem;

C: a part of nozzles caused jetting failure, but judged as being within a practically allowable range; and D: not a few nozzles caused clogging, bend in track of the droplets, and intermittent jetting, judged as practically problematic.

<Rectilinear Propagation Property of Ink Droplets>

According to the individual conditions described in the above, a cycle of a 5-minute image formation and a 5-minute interruption was repeated for 15 weeks, and the ink injection status was visually observed, flight status of the ink droplets was confirmed under a stereo-microscope of 20 magnifications, and rectilinear propagation property of the ink droplets was evaluated referring to the criteria shown below:

○: all jetting nozzles ensured rectilinear flight of ink droplets without bend;

Δ: a part of nozzles showed a slight bend in the flight of the ink droplets, but in an almost allowable range; and X: a part of nozzles showed an apparent bend in the flight of the ink droplets.

<Evaluation of Deposition Tendency of Foreign Matters>

According to the individual conditions described in the above, a cycle of a 5-minute image formation and a 5-minute interruption was repeated for one month, the ink supply tube after one month was disassembled, status of the inner surface thereof was observed through a magnifying glass in order to confirm presence or absence of any deposited foreign matters, and deposition tendency of the foreign matters was evaluated referring to the criteria shown below:

◎: no adhesion observed on the inner surface of the ink supply tube;

○: a trace amount of adhesion of foreign matters observed, but not causative of any problem;

Δ: adhesion of foreign matters on the inner surface of the ink supply tube observed, but within a practically allowable range; and X: a large amount of adhesion of foreign matters observed on the inner surface of the ink supply tube, and is practically problematic.

Results were shown in Table 2.

TABLE 2

| | Ink supply tube | | Driving | | Evaluated Characteristics | | | |
|---|---|---|---|---|---|---|---|---|
| Ink jetting method | Species | Average surface roughness of inner surface (nm) | frequency of ink recording head (kHz) | Species of pigment ink | Jetting stability | Rectilinear propagation property of ink droplets | Deposition tendency of foreign matters | Remarks |
| 1 | 3 | 505 | 37 | 1 | A | ○ | ◎ | Invention |
| 2 | 3 | 505 | 37 | 2 | B | ○ | ○ | Invention |
| 3 | 3 | 505 | 37 | 3 | B | Δ | ○ | Invention |
| 4 | 3 | 505 | 37 | 4 | C | ○ | ○ | Invention |
| 5 | 3 | 505 | 37 | 5 | A | ○ | ◎ | Invention |
| 6 | 3 | 505 | 37 | 6 | B | ○ | ○ | Invention |
| 7 | 3 | 505 | 37 | 7 | B | ○ | ○ | Invention |
| 8 | 3 | 505 | 37 | 8 | C | ○ | ○ | Invention |
| 9 | 3 | 505 | 37 | 9 | D | X | X | Comparative |
| 10 | 3 | 505 | 37 | 10 | D | X | X | Comparative |
| 11 | 2 | 350 | 37 | 5 | B | ○ | ◎ | Invention |
| 12 | 4 | 748 | 37 | 5 | A | ○ | ◎ | Invention |
| 13 | 5 | 1892 | 37 | 5 | B | ○ | ○ | Invention |
| 14 | 1 | 113 | 37 | 9 | D | X | Δ | Comparative |
| 15 | 6 | 3105 | 37 | 10 | D | X | X | Comparative |

TABLE 2-continued

| | Ink supply tube | | Driving | | Evaluated Characteristics | | | |
|---|---|---|---|---|---|---|---|---|
| Ink jetting method | Species | Average surface roughness of inner surface (nm) | frequency of ink recording head (kHz) | Species of pigment ink | Jetting stability | Rectilinear propagation property of ink droplets | Deposition tendency of foreign matters | Remarks |
| 16 | 1 | 113 | 37 | 5 | C | Δ | Δ | Comparative |
| 17 | 6 | 3105 | 37 | 5 | D | X | X | Comparative |

As is clear from Table 2, the jetting method of the present invention in which the ink having the individual physical properties specified in the present invention was jetted by the ink jet recording apparatus having a driving frequency of the ink jet recording head of 15 kHz or above, and an average surface roughness of the inner surface of the ink supply tube of 200 to 2,000 nm, was far less in the adhesive property of the foreign matters in the ink supply tube and better in the jetting stability as well as in the rectilinear propagation property of the ink droplets during the continuous jetting as compared with those in the comparative examples.

Example 2

Yellow inks, cyan inks and black inks were prepared similarly to as described in Example 1 for the magenta pigment inks, and the continuous jetting for forming a full-color image was carried out according to the combinations same as those described in Example 1. Similarly to as indicated by the results of Example 1, the ink jet recording method based on the combinations conforming to the present invention was found to be far less in the adhesive property of the foreign matters in the ink supply tube and better in the jetting stability as well as in the rectilinear propagation property of the ink droplets during the continuous jetting as compared with those in the comparative examples.

The entire disclosure of Japanese Patent Application No. Tokugan 2002-289842 which was filed on Oct. 2, 2002, including specification, claims, drawings and summary are incorporated herein by reference in its entirety.

What is claimed is:

1. An ink jet recording apparatus for jetting ink onto a recording medium comprising:

an ink cartridge;

an ink jet recording head; and an ink supply tube which connects the ink cartridge and the ink jet recording head, wherein a diving frequency of the ink jet recording head is 15 kHz or above, an average surface roughness of an inner surface of the ink supply tube is 200 to 2,000 nm, and the ink contains a colorant, water and a water-soluble organic solvent, the ink having a dissolved oxygen concentration of 4 ppm or below.

2. The ink jet recording apparatus of claim 1, wherein the ink contains a colorant, water and a water-soluble organic solvent, the ink having a viscosity of 3.0 to 8.0 mPa·s.

3. The ink jet recording apparatus of claim 1, wherein the ink contains a colorant, water and a water-soluble organic solvent, the ink having a surface tension of 20 to 35 mN/m.

4. The ink jet recording apparatus of claim 1, wherein the dissolved oxygen concentration is 2 ppm or below.

5. The ink jet recording apparatus of claim 1, wherein the dissolved oxygen concentration is 0.01 to 1 ppm or below.

6. The ink jet recording apparatus of claim 1, wherein the ink contains a colorant, water and a water-soluble organic, solvent, the ink having a foaming power of 100 mm or below.

7. The ink jet recording apparatus of claim 1, wherein die driving frequency of the ink jet recording bead is 25 kHz or above.

8. The ink jet recording apparatus of claim 1, wherein the driving frequency of die ink jet recording head is 35 kHz or above.

9. The ink jet recording apparatus of claim 1, wherein a contact angle of the ink to the inner surface of the ink supply tube is 60° or below.

10. The ink jet recording apparatus of claim 1, wherein a contact angle of the ink to the inner surface of the ink supply tube is 10° to 60°.

11. The ink jet recording apparatus of claim 1, wherein an average roughness of the inner surface of the ink supply tube is 400 to 1,000 nm.

12. The ink jet recording apparatus of claim 1, wherein the colorant is a pigment.

13. The ink jet recording apparatus of claim 1, wherein the ink contains 1 to 15 wt % of triethylene glycol monobutyl ether, 1,2-hexanediol, 1,2-pentanediol or t-butanol.

14. The ink jet recording apparatus of claim 1, wherein a total content of calcium ion, magnesium ion and iron ion in the ink is 10 ppm or below.

15. The ink jet recording apparatus of claim 1, wherein the ink contains an acetylene glycol-base nonionic surfactant.

16. An ink jet recording method for jetting ink onto a recording medium by using an ink jet recording apparatus which has an ink cartridge, an ink jet recording bead, and an ink supply tube having an average surface roughness of an inner surface of 200 to 2,000 nm, which connects the ink cartridge and die ink jet recording head, comprising:

driving the ink jet recording head at a driving frequency of 15 kHz or above, wherein the ink contains a colorant, water and a water-soluble organic solvent, the ink having a dissolved oxygen concentration of 4 ppm or below.

17. The ink jet recording method of claim 16, wherein the ink contains a colorant, water and a water-soluble organic solvent, the ink having a viscosity of 3.0 to 8.0 mPa·s.

18. The ink jet recording method of claim 16, wherein the ink contains a colorant, water and a water-soluble organic solvent, the ink having a surface tension of 20 to 35 mN/m.

19. The ink jet recording method of claim 16, wherein the dissolved oxygen concentration is 2 ppm or below.

20. The ink jet recording apparatus of claim 16, wherein the dissolved oxygen concentration is 0.01 to 1 ppm or below.

21. The ink jet recording method of claim 16, wherein the ink contains a colorant, water and a water-soluble organic solvent, the ink having a foaming power of 100 mm or below.

22. The ink jet recording method of claim 16, wherein the driving frequency of the ink jet recording head is 25 kHz or above.

23. The ink jet recording method of claim 16, wherein the driving frequency of the ink jet recording bead is 35 kHz or above.

24. The ink jet recording method of claim 16, wherein a contact angle of the ink to the inner surface of the ink supply tube is 60° or below.

25. The ink jet recording method of claim 16, wherein a contact angle of the ink to the inner surface of the ink supply tube is 10° to 60°.

26. The ink jet recording method of claim 16, wherein an average roughness of the inner surface of the ink supply tube is 400 to 1,000 nm.

27. The ink jet recording apparatus of claim 16, wherein the colorant is a pigment.

28. The ink jet recording method of claim 16, wherein the ink contains 1 to 15 wt % of triethylene glycol monobutyl ether, 1,2-hexanediol, 1,2-pentanediol or t-butanol.

29. The ink jet recording method of claim 16, wherein a total content of calcium ion, magnesium ion and iron ion in the ink is 10 ppm or below.

30. The ink jet recording method of claim 16, wherein the ink contains an acetylene glycol-base nonionic surfactant.

* * * * *